US010432524B2

(12) United States Patent
Han et al.

(10) Patent No.: US 10,432,524 B2
(45) Date of Patent: Oct. 1, 2019

(54) PARALLELISM FOR VIRTUAL NETWORK FUNCTIONS IN SERVICE FUNCTION CHAINS

(71) Applicants: AT&T Intellectual Property I, L.P., Atlanta, GA (US); Regents of the University of Minnesota, Minneapolis, MN (US)

(72) Inventors: Bo Han, Bridgewater, NJ (US); Muhammad Bilal Anwer, Branchburg, NJ (US); Vijay Gopalakrishnan, Edison, NJ (US); Aman Shaikh, Berkeley Heights, NJ (US); Joshua Reich, Berkeley, CA (US); Yang Zhang, Saint Paul, MN (US); Zhi-Li Zhang, Eden Prairie, MN (US)

(73) Assignees: AT&T Intellectual Property I, L.P., Atlanta, GA (US); Regents of the University of Minnesota, Minneapolis, MN (US)

( * ) Notice: Subject to any disclaimer, the term of this patent is extended or adjusted under 35 U.S.C. 154(b) by 64 days.

(21) Appl. No.: 15/849,200

(22) Filed: Dec. 20, 2017

(65) Prior Publication Data
US 2019/0190827 A1 Jun. 20, 2019

(51) Int. Cl.
*H04L 12/741* (2013.01)
*G06F 9/455* (2018.01)
(Continued)

(52) U.S. Cl.
CPC ............ *H04L 45/745* (2013.01); *G06F 9/455* (2013.01); *G06F 9/45558* (2013.01);
(Continued)

(58) Field of Classification Search
None
See application file for complete search history.

(56) References Cited

U.S. PATENT DOCUMENTS 9,462,084 B2 10/2016 Connor et al.
9,634,936 B2 4/2017 Bansal et al.
(Continued)

OTHER PUBLICATIONS

Zhang et al., "ParaBox: Exploiting Parallelism for Virtual Network Functions in Service Chaining," ACM Symposium on SDN Research (SOSR 2017), Apr. 3-4, 2017.

*Primary Examiner* — Ajit Patel
(74) *Attorney, Agent, or Firm* — Hartman & Citrin LLC

(57) ABSTRACT

The concepts and technologies disclosed herein are directed to parallelism for virtual network functions ("VNFs") in service function chains ("SFCs"). According to one aspect, a packet processing system can receive instructions to process, in parallel, at least a portion of a plurality of data packets associated with an SFC including a plurality of VNFs. The system can create a copy of at least the portion of the data packets. The system can send the copy of at least the portion of the data packets to at least two VNFs. The at least two VNFs can process, in parallel, the copy of at least the portion of the data packets. The system can receive, from the at least two VNFs, processed packets including the copy of at least the portion of the data packets and processed, in parallel, by the at least two VNFs. The system can combine the processed packets.

20 Claims, 5 Drawing Sheets

(51) Int. Cl.
*H04L 12/721* (2013.01)
*H04L 12/815* (2013.01)

(52) U.S. Cl.
CPC .............. *H04L 45/38* (2013.01); *H04L 47/22* (2013.01); *G06F 2009/45595* (2013.01)

(56) References Cited

U.S. PATENT DOCUMENTS

| | | |
|---|---|---|
| 9,742,790 B2 | 8/2017 | Sood et al. |
| 2017/0052809 A1 | 2/2017 | Kano |
| 2017/0093721 A1 | 3/2017 | Kano |
| 2017/0171066 A1 | 6/2017 | Hao et al. |
| 2017/0171871 A1 | 6/2017 | Ryan et al. |
| 2017/0192806 A1* | 7/2017 | Koat ................. H04L 12/66 |
| 2017/0214613 A1 | 7/2017 | Zhang et al. |
| 2017/0288971 A1 | 10/2017 | Jayaraman et al. |
| 2017/0331884 A1* | 11/2017 | Colle ............... H04L 41/0668 |

* cited by examiner

PARALLELISM FOR VIRTUAL NETWORK FUNCTIONS IN SERVICE FUNCTION CHAINS

BACKGROUND

A service function chain ("SFC") defines a sequence of network functions ("NFs"), such as firewalls and load balancers ("LBs"), and stitches them together. The SFC has been a key enabler for network operators to offer diverse services and an important application of software defined networking ("SDN"). Recently, operators have begun to apply network functions virtualization ("NFV") to SFC, using virtualized NFs (known as virtual network functions or "VNFs") running on commodity servers. While NFV ameliorates some of the challenges operators face in deploying SFCs (e.g., elastic service provisioning), NFV exacerbates others. In particular, traffic traversing virtualized SFCs may suffer from reduced throughput and increased latency. Moreover, the flexibility offered by the combination of SDN and NFV might result in SFC length increasing as networks become ever more highly automated, thus making this challenge ever more relevant.

SUMMARY

The concepts and technologies disclosed herein describe parallelism for VNFs in SFCs. The concepts and technologies disclosed herein provide a novel packet processing system that, when possible, mirrors data packets to NFs in parallel and then intelligently merges together the output traffic. To ensure correctness, the traffic emitted by a merge function is identical to that which would have been emitted had the traffic traversed the NFs in the traditional sequential manner. Since not all VNFs are capable of operating in parallel, the packet processing system identifies opportunities for parallelism through an analysis function. In summary, the packet processing system is designed as a hybrid architecture that leverages both sequential and parallel packet processing.

According to one aspect of the concepts and technologies disclosed herein, a packet processing system can include a processor and a memory. The memory can have instructions stored thereon that, when executed by the processor, cause the processor to perform operations. In particular, the packet processing system can receive, by a mirror function, from a controller executing an order-dependency analysis function, instructions to process, in parallel, at least a portion of a plurality of data packets associated with an SFC including a plurality of VNFs. The packet processing system can create, by the mirror function, a copy of at least the portion of the plurality of data packets associated with the SFC. The packet processing system can send, by the mirror function, the copy of at least the portion of the plurality of data packets associated with the SFC to at least two VNFs of the plurality of VNFs. The at least two VNFs can process, in parallel, the copy of at least the portion of the plurality of data packets associated with the SFC. The packet processing system can receive, from the at least two VNFs, processed packets including the copy of at least the portion of the plurality of data packets associated with the SFC, each after having been processed, in parallel, by the at least two VNFs. The packet processing system can combine, by a merge function, the original packets (i.e., pre-processing—at least the portion of the plurality of data packets) and the processed packets.

In some embodiments, the packet processing system can receive, by a configuration function, an SFC layout from the controller. The SFC layout can identify the at least two VNFs in the SFC. The packet processing system can determine, by the configuration function, how to mirror at least the portion of the plurality of data packets to the at least two VNFs. In some embodiments, the packet processing system can receive, by the configuration function, information about the at least two VNFs to be utilized by the merge function.

In some embodiments, the mirror function and the merge function can utilize tables to perform, at least in part, the operations described above. In one embodiment, the tables include a traffic steering table and a packet state table. The traffic steering table can include a flow ID, a service chain ID, and a description of the plurality of VNFs. The packet state table can include a per-packet unique ID for each data packet in the plurality of data packets, a packet reference, an intermediate packet buffer, a VNF counter array, and a timeout. The per-packet unique ID can include a key for each item listed in the packet state table and for mapping the plurality of data packets in the merge function. The packet reference can include a pointer for each data packet in the plurality of data packets to a memory address in which a corresponding original data packet is stored for use by the merge function. The VNF counter array can record a number of VNFs in each parallel component of the SFC. In some embodiments, the merge function can combine the processed packets in response to a VNF counter in the VNF counter array reaching zero.

In some embodiments, the processor and the memory of the packet processing system are implemented in a server that also implements the plurality of VNFs. In some embodiments, the processor and the memory are part of hardware resources of an NFV platform. The controller also can be executed on the NFV platform. In some embodiments, the packet processing system is implemented, at least in part, in a soft switch executed on the NFV platform. In these embodiments, the soft switch is extensible via modules that, when executed, perform operations of the foregoing configuration, mirror, merge, and order-dependency analysis functions.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

SFCs include a sequence of NFs that are typically traversed in order by data packet flows. Consequently, SFC delay grows linearly with the length of the SFC. However, for latency sensitive applications, this delay might be unacceptable—particularly when the constituent NFs are virtualized (i.e., VNFs), running on commodity servers. The concepts and technologies disclosed herein describe how to reduce SFC latency by instead exploiting opportunities for parallel packet processing across NFs. The concepts and technologies disclosed herein provide a novel hybrid packet processing system that, when possible, dynamically distributes packets to VNFs in parallel and intelligently merges the output thereof to ensure the preservation of sequential processing semantics. In some embodiments disclosed herein, the hybrid packet processing system can be implemented on top of an extensible software switch. The hybrid packet processing system can significantly reduce service function chaining latency and improve throughput.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
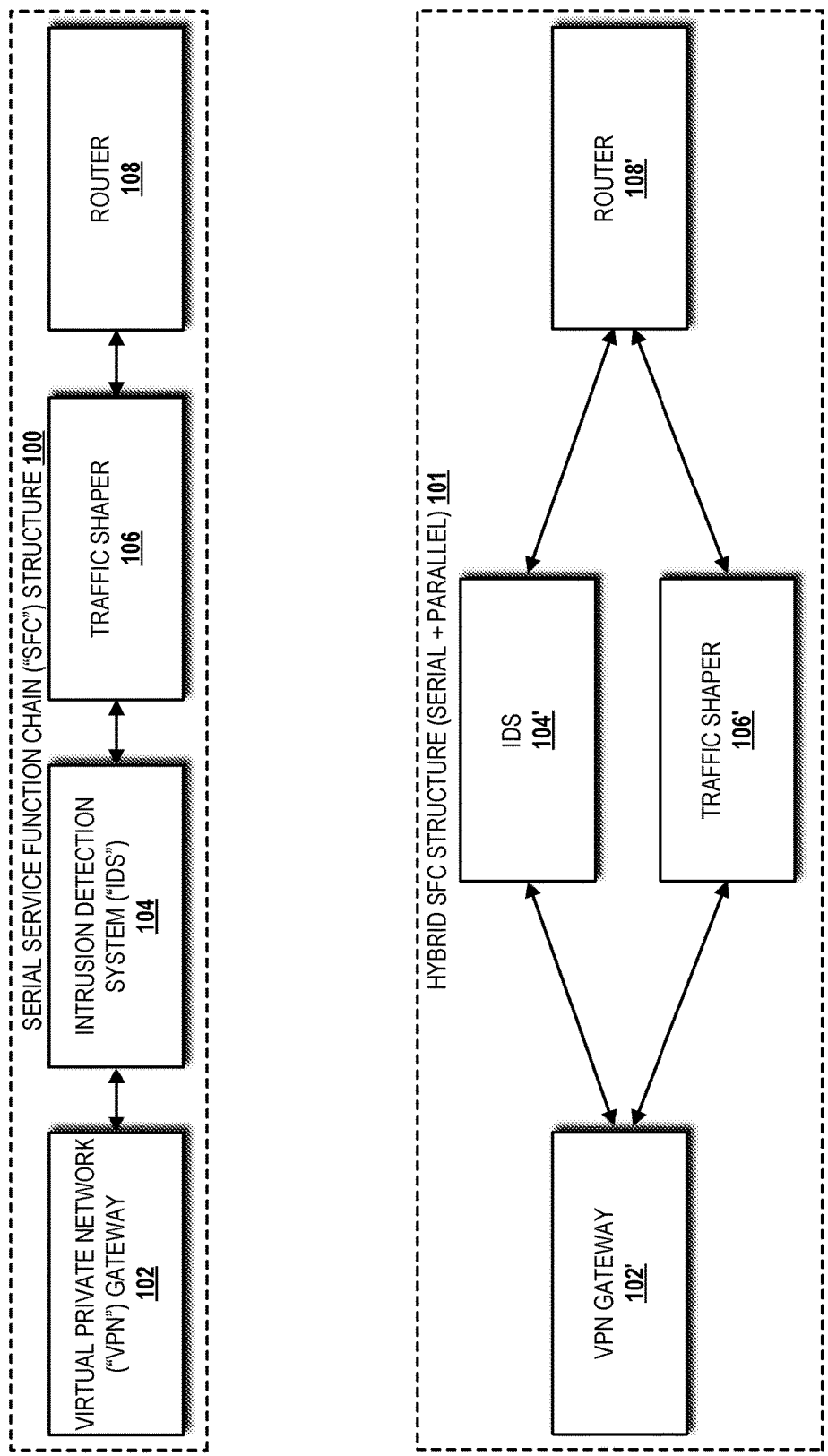
FIG. 1 is a block diagram illustrating a serial SFC structure of NFs utilized in existing SFC technologies, and a hybrid SFC structure of NFs, according to an illustrative embodiment of the concepts and technologies disclosed herein.

Referring now to FIG. 1, a block diagram illustrating a serial SFC structure 100 of NFs utilized in existing SFC technologies, and a hybrid SFC structure 101 of NFs, according to an illustrative embodiment, will be described. The illustrated serial SFC structure 100 shows a plurality of VNFs, including a virtual private network ("VPN") gateway 102, an intrusion detection system ("IDS") 104, a traffic shaper 106, and a router 108, operating in sequential order. The IDS 104 and the traffic shaper 106 are capable of operating in sequential order and in parallel. The VPN gateway 102 and the router 108 are only capable of operating in sequential order. The hybrid SFC structure 101 shows the VPN gateway 102' and the router 108' operating in sequential order with the IDS 104' and the traffic shaper 106' operating in parallel. In the hybrid SFC structure 101, data packets first traverse the VPN gateway 102', then the IDS 104' and the traffic shaper 106' in parallel, and finally the router 108'. Parallel packet processing can reduce SFC latency. This addresses an important problem for network operators because the latency of an SFC with multiple VNFs might be unacceptable for latency-sensitive applications.

Enabling parallel packet processing among VNFs is challenging for several reasons. One reason for this is the mirror and merge functions (common in parallel processing technologies) should be lightweight to avoid the introduction of too much latency; otherwise, the benefit of parallel packet processing will be negated by this extra delay. Another reason for this is a need to determine what VNFs are capable of operating in parallel by carefully analyzing the order dependency of VNFs in a given SFC. Finally, to enable incremental deployment, a parallel packet processing system should not require any changes to VNFs.

NFs such as firewall, Network Address Translation ("NAT"), Intrusion Prevention System ("IPS"), Wide Area Network ("WAN") optimizer ("WANX"), and the like are generally deployed as inline services and end users are usually unaware of the existence of these NFs. This set of NFs can form an SFC with use cases in various networks. Multiple network implementations can be used to steer data packet flows through the SFC. A basic implementation is to physically wire an NF in a dedicated hardware middle box and statically place the NF at manually induced intermediate points. The pre-defined nature of this implementation makes it difficult to reconfigure the SFC, which is prone to errors and increases the management complexity for network operators. The advent of NFV and SDN has greatly facilitated traffic steering in SFC, at least in part, by leveraging a logically centralized control plane (e.g., provided, in part, by an SDN controller) and providing the programmability of a forwarding plane.

At a high level, packet processing can be parallelized among NFs only if the NFs are independent of each other in a SFC. Otherwise, the correctness of network and service policies might be broken. There are multiple factors that impact the NF order dependency for service function chaining. One factor is the read and write operations of NFs on data packets. Another factor is the termination of data packets flows (e.g., flows dropped by a firewall) in an NF that affects the correctness and/or efficiency of the next NF. Yet another factor is packet reconstruction (e.g., merged by a WAN optimizer). An NF also has multiple instances and uses a load balancer before the instances to balance the load.

Table 1 below shows the read and write operations of both packet header ("HDR") and payload ("PL"; beyond the Transfer Control Protocol or "TCP" header) for NFs commonly used in networks. Some NFs, such as a WANX, might add extra bits into packets. Table 1 shows operations performed by several example VNFs on a per-packet basis. The read/write behavior of a VNF can change from one implementation to another. Similarly, configuration of individual VNFs can impact a VNF's packet operations. Table 1 also represents an abstraction that can be used to perform order-dependency analysis of VNFs for SFCs.

TABLE 1

| VNFs | HDR R/W | PL R/W | Add Bits | Examples |
| --- | --- | --- | --- | --- |
| Probe | T/F | F/F | F | Flowmon |
| IDS | T/F | T/F | F | Snort/Bro |
| Firewall | T/F | F/F | F | iptables |
| NAT | T/T | F/F | F | iptables |
| L4 LB | T/F | F/F | F | iptables |
| WANX | T/T | T/T | T | WANProxy |
| Shaper | T/F | F/F | F | tc |
| Proxy | T/F | T/T | F | Squid |

The following relationships can be present between VNFs based on each VNF's operations on packet data, including Read after Read ("RAR"), Read after Write (RAW), Write after Read ("WAR"), and Write after Write ("WAW"). Two VNFs that perform RAR and WAR operations can be safely parallelized. Two VNFs that perform WAW and RAW operations cannot be parallelized if the packet data that is being written/read in the second VNF overlaps with what is written in the first VNF.

An example can be used to illustrate the problems caused by flow termination. When there is a firewall before a proxy or an IDS, parallelization can cause the proxy and the IDS to generate reports for flows that should be dropped by the firewall, which affects the correctness of the proxy and the IDS. If there is a load balancer after a firewall, parallel processing can send dropped flows to the load balancer, which impacts the efficiency of the load balancing algorithm utilized by the load balancer. For other cases, such as a firewall before a NAT, parallelization might increase the resource utilization on the NAT. The sequential processing can be implemented as a fallback when the firewall drops a large number of flows.

Table 2 below shows if various two-NF SFCs can be parallelized using a packet processing system 202 (best shown in FIG. 2 and described in detail below) disclosed herein. The first NF of the SFC is in the leftmost column and the second NF is in the top row. The SFCs that can be parallelized by the packet processing system 202 are marked with a Y. The SFCs that cannot be parallelized or do not have a deployment case are marked as N or X, respectively. It should be noted that all the SFCs that have a NAT as the first hop are not parallelizable. The reason for this is that the policy of the next hop (e.g., firewall rules) might be defined on the IP address of the packets from a NAT. In the concepts and technologies disclosed herein, data packets arriving at the firewall have an unmodified IP address, which renders the firewall rules ineffective. However, if the policy configuration is aware of the packet processing system 202 (e.g., defining the firewall rules on the original source IP address, instead of the one assigned by NAT), many of these SFCs can be parallelized. Table 2 assumes that WANX is applied to outgoing network traffic, and thus should not be deployed before IDS, firewall, NAT, etc.

TABLE 2

|  | Probe | IDS | Firewall | NAT | L4 LB | WANX | Shaper | Proxy |
|---|---|---|---|---|---|---|---|---|
| Probe |  | Y | Y | Y | Y | Y | Y | Y |
| IDS | Y |  | Y | Y | Y | Y | Y | Y |
| Firewall | N | N |  | Y | N | Y | Y | N |
| NAT | N | N | N |  | N | N | N | N |
| L4 LB | N | N | N | N |  | N | N | N |
| WANX | Y | X | X | X | X |  | Y | X |
| Shaper | N | Y | Y | Y | Y | Y |  | Y |
| Proxy | Y | Y | Y | Y | Y | N | Y |  |

Figure 2:
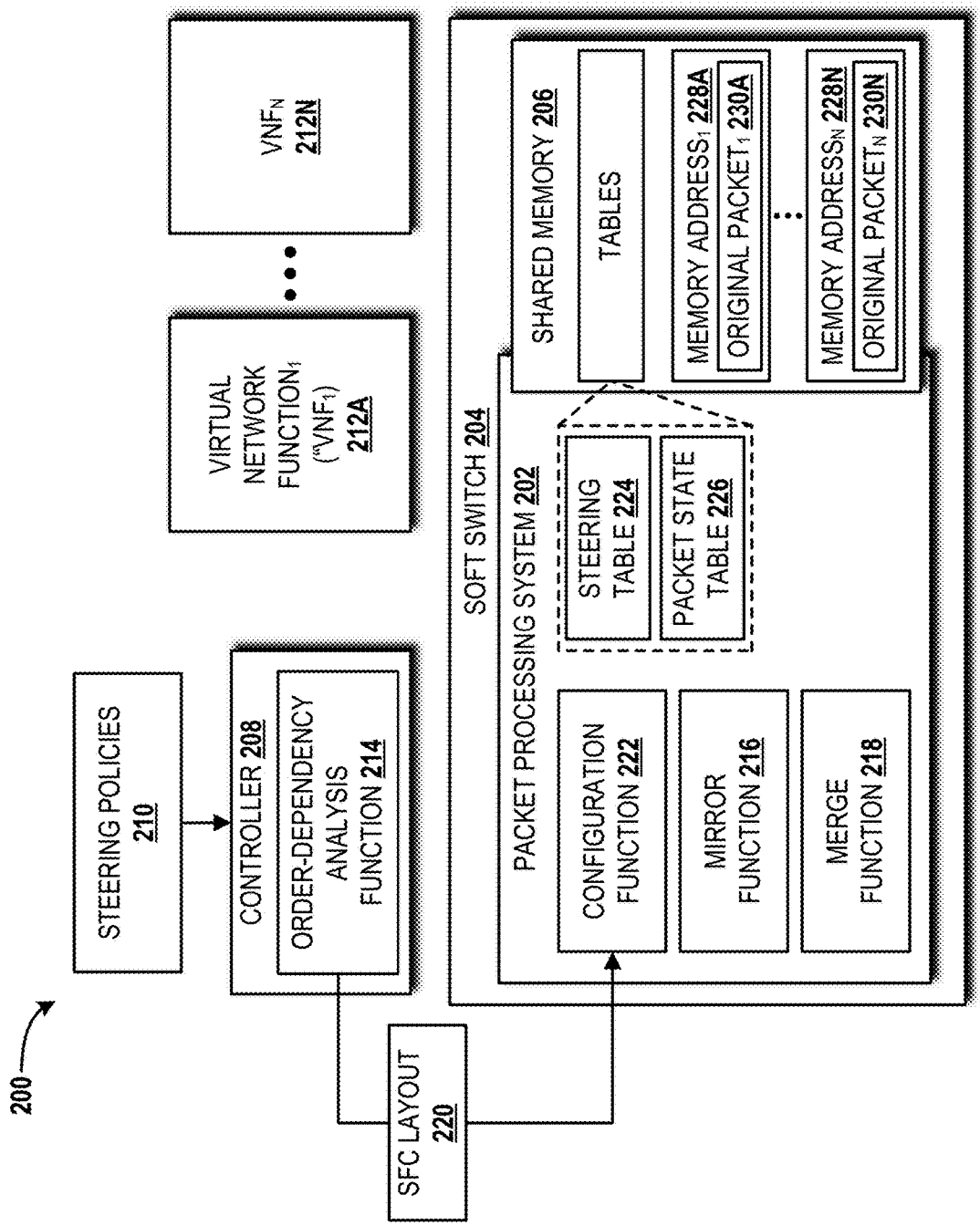
FIG. 2 is a block diagram illustrating aspects of an illustrative operating environment in which aspects of the concepts and technologies disclosed herein can be implemented.

Turning now to FIG. 2, a block diagram illustrating an illustrative operating environment 200 in which aspects of the concepts and technologies disclosed herein can be implemented will be described. The operating environment 200 includes the packet processing system 202 operating on top of a soft switch 204 with a shared memory 206, a controller 208, one or more steering policies 210, and a plurality of VNFs 212A-212N (also referred to herein collectively as "VNFs 212," or individually as "VNF 212").

The packet processing system 202 allows additional components to be added to SFCs. The additional components should be lightweight without adding extra noticeable latency and should require only minimal knowledge of the VNFs for scalability. The packet processing system 202 can be implemented with a service orchestrator and controller (e.g., the controller 208) to analyze the VNF order-dependency in a defined SFC. The packet processing system 202 should not require changes to NFs in order to leverage existing VNFs from various vendors and deploy the packet processing system 202 incrementally. To provide these features, the illustrated operating environment 200 includes an order-dependency analysis function 214 operating in the controller 208, and a mirror function 216 and a merge function 218 operating in the packet processing system 202.

The order-dependency analysis function 214 receives, as input, an SFC and examines data packets that traverse the SFC to determine whether the SFC can be processed in parallel. Based upon the output of the analysis performed by the order-dependency analysis function 214, the mirror function 216 can send copies of the data packets to any parallel-capable VNFs of the VNFs 212 in the SFC. The merge function 218 can combine the data packets after the data packets are processed by the parallel-capable VNFs (i.e., processed packets) and the original (pre-processed packets).

The order-dependency analysis function 214 operating in the controller 208 can generate an SFC layout 220 identifying any parallel SFC components. The SFC layout 220 can be sent to a configuration function 222 operating in the packet processing system 202. The configuration function 222 uses the SFC layout 220 to determine how to mirror data packets to parallel VNF instances. To decide what parts of an SFC can be parallelized, the order-dependency analysis function 214 can consider the principles based upon NF functionality and configuration (i.e., NF models), as summarized above. The order-dependency analysis function 214 also can consider the actions performed by NFs. For example, a firewall can terminate a session, but the firewall should not modify the data packets. In contrast, a NAT can rewrite a packet header, but cannot terminate a session. The controller 208 can send selected information about one or more of the VNFs 212 to the configuration function 222 to be utilized by the merge function 218, as will be described below.

Based upon a given SFC, and if the next hop is a parallel component in the SFC, the mirror function 216 can create a copy of data packets and send the copy to each VNF 212 operating in parallel. For the merge function 218, data packets can be modeled as a sequence of bits. A case in which the VNFs 212 operating in parallel do not insert extra bits into the data packets will now be described. Assuming $P_O$ is the original packet, and there are two VNFs 212—VNF A and VNF B—in the SFC with $P_A$ and $P_B$ as the VNF's outputs, the final merged packet is given by $P_M=[(P_O \oplus P_A) | (P_O \oplus P_B)] \oplus P_O$. Every output packet of a VNF 212 can be XOR'd with the original packet to obtain the modified bits and to keep the result in an intermediate buffer. Since parallel-capable VNFs do not modify the same field of a packet, all modified bits can be obtained from multiple VNFs by combining (or) the above XOR results incrementally. For example, assuming $P_A$ arrives first, the modified bits $P_O \oplus P_A$ can be obtained. After the merge function 218 receives $P_B$, the merge function 218 will OR VNF B's modified bits $P_O$ ED $P_B$ with VNF A's. These operations can be performed when the merge function 218 receives packets from all parallel VNFs, which, in turn, triggers the XOR of all modified bits with $P_O$. An advantage of this approach is that the merge function 218 does not need to know in advance which field a VNF modifies. For VNFs that insert extra bits, the merge function 218 can first remove the extra bits and add the extra bits back to the above $P_M$. It should be noted that there can be a mirror operation and a merge operation for every parallel component of a given SFC.

The mirror function 216 and the merge function 218 can utilize a steering table 224 and a packet state table 226 stored in the shared memory 206 to perform, at least in part, the aforementioned operations. The traffic steering table 224 describes SFCs. The traffic steering table 224 can include three fields: (1) flow ID; (2) service chain; and (3) description of VNFs, if necessary. For example, an exemplary hybrid SFC with VNFs A-H can be denoted as A, {B, C}, D, {E, F, G}, H with two parallel components ({B, C} and {E, F, G}) and three sequential VNFs A, D, and H. A description, if necessary, can be provided for the VNFs that add data to packets (e.g., a layer 7 load balancer and WANX). The packet state table 226 can include five fields: (1) per-packet unique ID; (2) packet reference; (3) intermediate packet buffer; (4) VNF counter array; and (5) timeout. The packet ID can be used as the key for each item in the state table 226 and for the mapping among packets in the merge function 218. The packet reference can be a pointer to a memory address 228 of a plurality of memory addresses 228A-228N in which an original packet 230 of a plurality of original packets 230A-230N is stored for use by the merge function 218. The shared memory 206 can use a packet buffer to hold the intermediate results of the merge function 218. The VNF counter array can record the number of VNFs in each parallel component of an SFC. For instance, the array for the above example can be denoted as {2, 3}. After a packet goes through a VNF, the corresponding counter will decrease by 1. When a counter reaches 0, the final merge operation performed by the merge function 218 can be triggered. Timeout can be used to handle packet drops.

In some embodiments, the packet processing system 202 can be implemented in the soft switch 204 embodied as an extensible software switch, such as one created using Berkeley Extensible Software Switch ("BESS"), which is a module framework natively integrated with Data Plane Development Kit ("DPDK"). The soft switch 204 can be embodied as different extensible software switches. BESS provides a flexible and high performance implementation of the soft switch 204 because BESS leverages batch processing to improve efficiency and is compatible with customized logic, such as the logic utilized by the mirror function 216, the merge function 218, and the configuration function 222 operating in the packet processing system 202 in the example embodiment shown in FIG. 2. The mirror function 216 and the merge function 218 can be implemented as BESS modules. The controller 208 can utilize a customized protocol to communicate with the configuration function 222. Other software switches, such as Open vSwitch and Vector Packet Processing are contemplated as alternatives for implementation of the soft switch 204.

Figure 3:
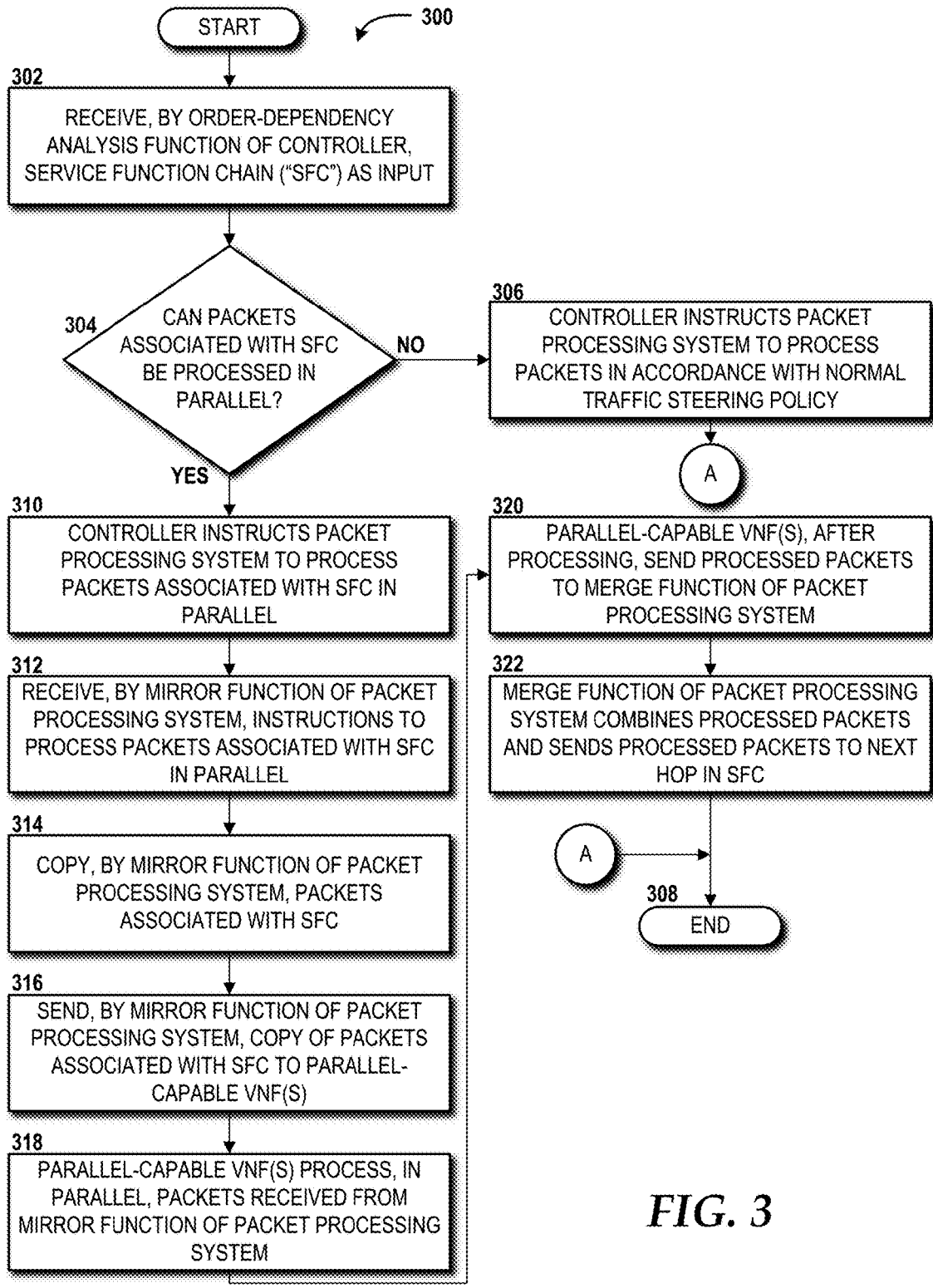
FIG. 3 is a flow diagram illustrating aspects of a method for providing parallelism for VNFs in SFCs, according to an illustrative embodiment.

Turning now to FIG. 3, aspects of a method 300 for providing parallelism for VNFs in SFCs will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the packet processing system 202, the soft switch 204, the controller 208, or some combination thereof to execute instructions to perform operations.

For purposes of illustrating and describing some of the concepts of the present disclosure, the methods disclosed herein are described as being performed, at least in part, by the packet processing system 202, the soft switch 204, the controller 208, or some combination thereof executing instructions for implementing the concepts and technologies disclosed herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302, where the order-dependency analysis function 214 of the controller 208 receives an SFC as input. From operation 302, the method 300 proceeds to operation 304, where the order-dependency analysis function 214 determines if the packets associated with the SFC can be processed in parallel. If the order-dependency analysis function 214 determines that the packets associated with the SFC cannot be processed in parallel, the controller 208 instructs the packet processing system 202 to process the packets associated with the SFC in accordance with a normal traffic steering policy of the steering policies 210 that causes the packets to be sequentially processed by the VNFs 212 of the SFC. From operation 306, the method 300 proceeds to operation 308, where the method 300 ends. If, however, at operation 304, the order-dependency analysis function 214 determines that the packets associated with the SFC can be processed in parallel, the controller 208 instructs the packet processing system 202 to process the packets associated with the SFC in parallel.

From operation 310, the method 300 proceeds to operation 312, where the mirror function 216 of the packet processing system 202 receives instructions from the order-dependency analysis function 214 of the controller 208 to process the packets associated with the SFC in parallel. From operation 312, the method 300 proceeds to operation 314, where the mirror function 216 of the packet processing system 202 copies the packets associated with the SFC. From operation 314, the method 300 proceeds to operation 316, where the mirror function 216 of the packet processing system 202 sends the copy of the packets associated with the SFC to the parallel-capable VNF(s) of the VNFs 212 in the SFC.

From operation 316, the method 300 proceeds to operation 318, where the parallel-capable VNF(s) process, in parallel, the packets received from the mirror function 216 of the packet processing system 202. From operation 318, the method 300 proceeds to operation 320, where the parallel-capable VNF(s), after processing, send the processed packets to the merge function 218 of the packet processing system 202. From operation 320, the method 300 proceeds to operation 322, where the merge function 218 of the packet processing system 202 combines the processed packets and sends the merged packets to the next hop in the SFC. From operation 322, the method 300 proceeds to operation 308, where the method 300 ends. The merge function 218 also can combine, with the processed packets the original (pre-processed) packets.

Figure 4:
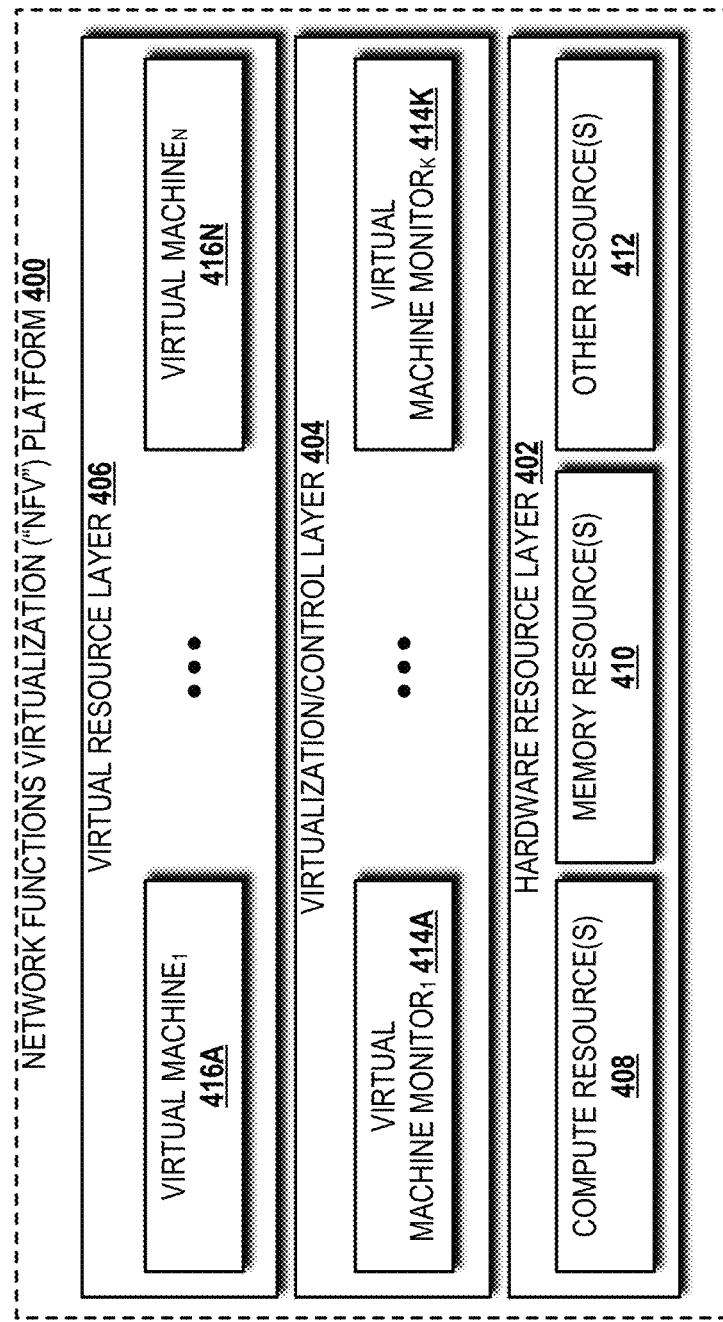
FIG. 4 is a block diagram illustrating a NFV platform capable of implementing aspects of the embodiments presented herein.

Turning now to FIG. 4, an NFV platform 400 capable of implementing aspects of the embodiments presented herein is described, according to an illustrative embodiment. The illustrated NFV platform 400 includes a hardware resource layer 402, a virtualization/control layer 404, and a virtual resource layer 406 that work together to perform operations as will be described in detail herein. The packet processing system 202, the soft switch 204, the controller 208, the VNFs 212, and/or other components described herein can be implemented, at least in part, on the NFV platform 400.

While connections are shown between some of the components illustrated in FIG. 4, it should be understood that some, none, or all of the components illustrated in FIG. 4 can be configured to interact with one another to carry out various functions described herein. In some embodiments, the components are arranged so as to communicate via one or more networks (best shown in FIG. 5). Thus, it should be understood that FIG. 4 and the following description are intended to provide a general understanding of a suitable environment in which various aspects of embodiments can be implemented, and should not be construed as being limiting in any way.

The hardware resource layer 402 provides hardware resources, which, in the illustrated embodiment, include one or more compute resources 408, one or more memory resources 410, and one or more other resources 412. The compute resource(s) 408 can include one or more hardware components that perform computations to process data, and/or to execute computer-executable instructions of one or more application programs, operating systems, and/or other software. The compute resources 408 can include one or more central processing units ("CPUs") configured with one or more processing cores. The compute resources 408 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 408 can include one or more discrete GPUs. In some other embodiments, the compute resources 408 can include CPU and GPU components that are configured in accordance with a co-processing CPU/GPU computing model, wherein the sequential part of an application executes on the CPU and the computationally-intensive part is accelerated by the GPU. The compute resources 408 can include one or more system-on-chip ("SoC") components along with one or more other components, including, for example, one or more of the memory resources 410, and/or one or more of the other resources 412. In some embodiments, the compute resources 408 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 408 can be or can include one or more hardware components architected in accordance with an ARM architecture, available for license from ARM HOLDINGS of Cambridge, United Kingdom. Alternatively, the compute resources 408 can be or can include one or more hardware components architected in accordance with an x86 architecture, such an architecture available from INTEL CORPORATION of Mountain View, Calif., and others. Those skilled in the art will appreciate the implementation of the compute resources 408 can utilize various computation architectures, and as such, the compute resources 408 should not be construed as being limited to any particular computation architecture or combination of computation architectures, including those explicitly disclosed herein. In some embodiments, the compute resources 408 can execute instructions for the order-dependency analysis function 214, the configuration function 222, the mirror function 216, the merge function 218, and/or some combination thereof.

The memory resource(s) 410 can include one or more hardware components that perform storage operations, including temporary or permanent storage operations. In some embodiments, the memory resource(s) 410 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 408. In some embodiments, the memory resource(s) 410 can include the shared memory 206. In some embodiments, the memory resource(s) 410 can store, at least in part, instructions for the order-dependency analysis function 214, the configuration function 222, the mirror function 216, the merge function 218, and/or some combination thereof.

The other resource(s) 412 can include any other hardware resources that can be utilized by the compute resources(s) 408 and/or the memory resource(s) 410 to perform operations described herein. The other resource(s) 412 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 402 can be virtualized by one or more virtual machine monitors ("VMMs") 414A-414k (also known as "hypervisors"; hereinafter "VMMs 414") operating within the virtualization/control layer 404 to manage one or more virtual resources that reside in the virtual resource layer 406. The VMMs 414 can be or can include software, firmware, and/or hardware that alone or in combination with other software, firmware, and/or hardware, manages one or more virtual resources operating within the virtual resource layer 406.

The virtual resources operating within the virtual resource layer 406 can include abstractions of at least a portion of the compute resources 408, the memory resources 410, the other resources 412, or any combination thereof. These abstractions are referred to herein as virtual machines ("VMs"). In the illustrated embodiment, the virtual resource layer 406 includes VMs 416A-416N (hereinafter "VMs 416"). The VMs 416 can execute, for example, the VNFs 212.

In some embodiments, a processor and a memory of the packet processing system 202 are implemented in a server (not shown) that also implements the plurality of VNFs 212 (see FIG. 2). In some embodiments, the processor and the memory are part of the hardware resources operating in the hardware resource layer 402 of the NFV platform 400. The controller 208 also can be executed on the NFV platform 400. In some embodiments, the packet processing system 202 is implemented, at least in part, in the soft switch 204 (as shown in FIG. 2) executed on the NFV platform 400.

Figure 5:
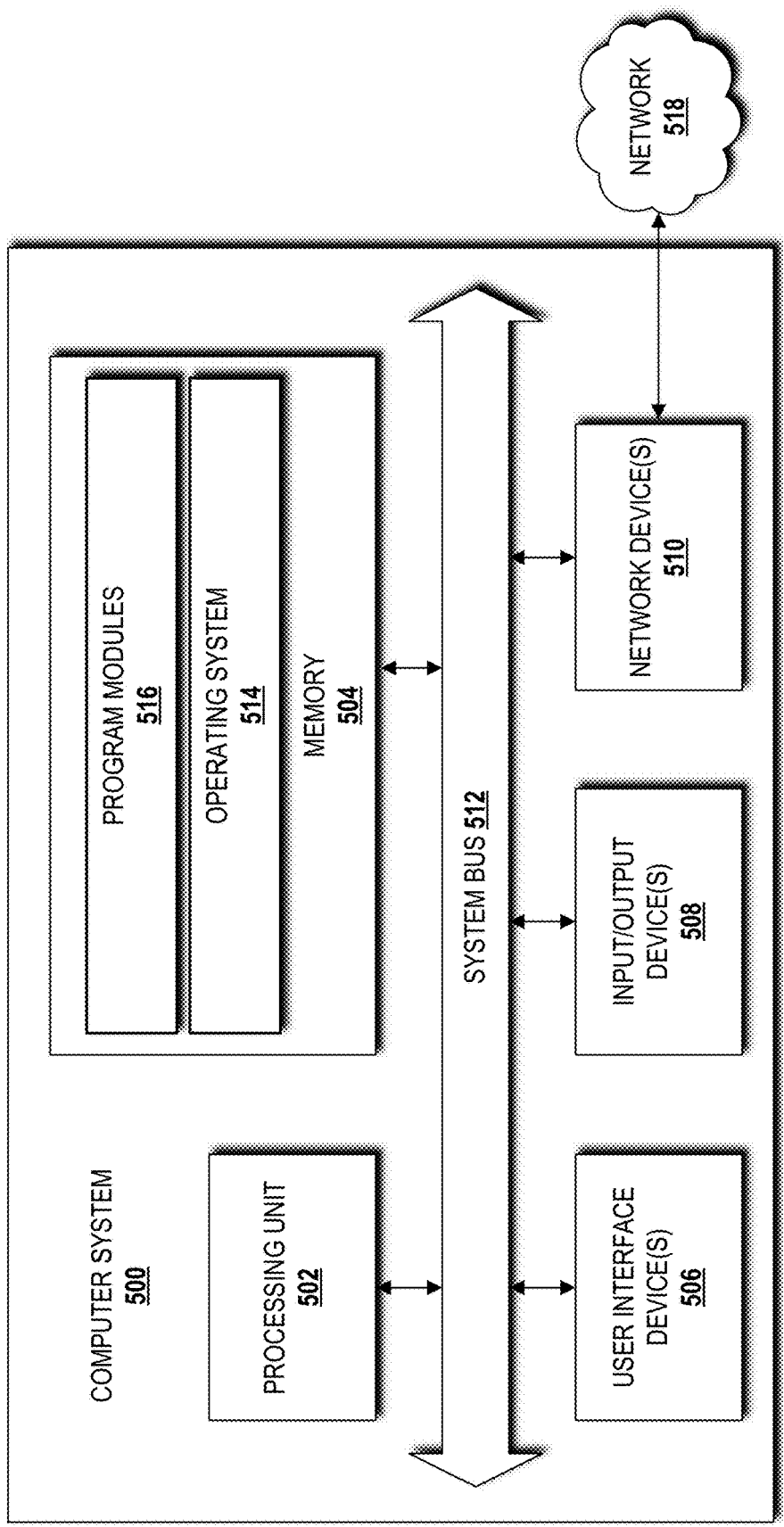
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. It should be understood, however, that modification to the architecture may be made to facilitate certain interactions among elements described herein. In some embodiments, the packet processing system 202, the soft switch 204, the controller 208, the VNFs 212, and/or other components described herein can be implemented, at least in part, using an architecture the same as or similar to the computer system 500.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN").

In some embodiments, a processor and a memory of the packet processing system 202 are implemented in a server (not shown) configured the same as or similar to the computer system 500 that also implements the plurality of VNFs 212 (see FIG. 2). In some embodiments, the processor is or is included in the processing unit 502 and the memory is or is included in the memory 504 of the computer system 500. The controller 208 also can be configured the same as or similar to the computer system 500. In some embodiments, the packet processing system 202 is implemented, at least in part, in the soft switch 204 (as shown in FIG. 2), both of which can be executed on the computer system 500.

Based on the foregoing, it should be appreciated that concepts and technologies directed to parallelism for VNFs in SFCs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A packet processing system:
a processor; and
memory having instructions stored thereon that, when executed by the processor, cause the processor to perform operations comprising
receiving, by a mirror function, from a controller executing an order-dependency analysis function, instructions to process, in parallel, at least a portion of a plurality of data packets associated with a service function chain comprising a plurality of virtual network functions,
creating, by the mirror function, a copy of at least the portion of the plurality of data packets associated with the service function chain,
sending, by the mirror function, the copy of at least the portion of the plurality of data packets associated with the service function chain to at least two virtual network functions of the plurality of virtual network functions, wherein the at least two virtual network functions process, in parallel, the copy of at least the portion of the plurality of data packets associated with the service function chain,
receiving, from the at least two virtual network functions, processed packets comprising the copy of at least the portion of the plurality of data packets associated with the service function chain, each after having been processed, in parallel, by the at least two virtual network functions, and
combining, by a merge function, the processed packets and at least the portion of the plurality of data packets.

2. The packet processing system of claim 1, wherein the operations further comprise receiving, by a configuration function, a service function chain layout from the controller, wherein the service function chain layout identifies the at least two virtual network functions in the service function chain.

3. The packet processing system of claim 2, wherein the operations further comprise determining, by the configuration function, how to mirror at least the portion of the plurality of data packets to the at least two virtual network functions.

4. The packet processing system of claim 3, wherein the operations further comprise receiving, by the configuration function, information about the at least two virtual network functions to be utilized by the merge function.

5. The packet processing system of claim 4, wherein the mirror function and the merge function utilize a traffic steering table and a packet state table; wherein the traffic steering table comprises a flow ID, a service chain ID, and a description of the plurality of virtual network functions; and wherein the packet state table comprises a per-packet unique ID for each data packet in the plurality of data packets, a packet reference, an intermediate packet buffer, a virtual network function counter array, and a timeout.

6. The packet processing system of claim 5, wherein the per-packet unique ID comprises a key for each item listed in the packet state table and for mapping the plurality of data packets in the merge function; wherein the packet reference comprises a pointer for each data packet in the plurality of data packets to a memory address in which a corresponding original data packet is stored for use by the merge function; wherein the virtual network function counter array records a number of virtual network functions in each parallel component of the service function chain; and wherein combining, by the merge function, the processed packets comprises in response to a virtual network function counter in the virtual network function counter array reaching zero, combining, by the merge function, the processed packets.

7. The packet processing system of claim 1, wherein the processor and the memory are implemented in a server comprising the plurality of virtual network functions.

8. A method comprising:
receiving, by a mirror function executed by a processor of a packet processing system, from a controller executing an order-dependency analysis function, instructions to process, in parallel, at least a portion of a plurality of data packets associated with a service function chain comprising a plurality of virtual network functions;
creating, by the mirror function, a copy of at least the portion of the plurality of data packets associated with the service function chain;
sending, by the mirror function, the copy of at least the portion of the plurality of data packets associated with the service function chain to at least two virtual network functions of the plurality of virtual network functions, wherein the at least two virtual network functions process, in parallel, the copy of at least the portion of the plurality of data packets associated with the service function chain;

receiving, by the packet processing system, from the at least two virtual network functions, processed packets comprising the copy of at least the portion of the plurality of data packets associated with the service function chain, each after having been processed, in parallel, by the at least two virtual network functions; and combining, by a merge function executed by the processor of the packet processing system, the processed packets and at least the portion of the plurality of data packets.

9. The method of claim 8, further comprising receiving, by a configuration function executed by the processor of the packet processing system, a service function chain layout from the controller, wherein the service function chain layout identifies the at least two virtual network functions in the service function chain.

10. The method of claim 9, further comprising determining, by the configuration function, how to mirror at least the portion of the plurality of data packets to the at least two virtual network functions.

11. The method of claim 10, further comprising receiving, by the configuration function, information about the at least two virtual network functions to be utilized by the merge function.

12. The method of claim 11, wherein the mirror function and the merge function utilize a traffic steering table and a packet state table; wherein the traffic steering table comprises a flow ID, a service chain ID, and a description of the plurality of virtual network functions; and wherein the packet state table comprises a per-packet unique ID for each data packet in the plurality of data packets, a packet reference, an intermediate packet buffer, a virtual network function counter array, and a timeout.

13. The method of claim 12, wherein the per-packet unique ID comprises a key for each item listed in the packet state table and for mapping the plurality of data packets in the merge function; wherein the packet reference comprises a pointer for each data packet in the plurality of data packets to a memory address in which a corresponding original data packet is stored for use by the merge function; wherein the virtual network function counter array records a number of virtual network functions in each parallel component of the service function chain; and wherein combining, by the merge function, the processed packets comprises in response to a virtual network function counter in the virtual network function counter array reaching zero, combining, by the merge function, the processed packets.

14. The method of claim 8, wherein the packet processing system is part of a soft switch.

15. A computer-readable storage medium having instructions stored thereon that, when executed by a processor of a packet processing system, cause the processor to perform operations comprising:

receiving, by a mirror function, from a controller executing an order-dependency analysis function, instructions to process, in parallel, at least a portion of a plurality of data packets associated with a service function chain comprising a plurality of virtual network functions;

creating, by the mirror function, a copy of at least the portion of the plurality of data packets associated with the service function chain;

sending, by the mirror function, the copy of at least the portion of the plurality of data packets associated with the service function chain to at least two virtual network functions of the plurality of virtual network functions, wherein the at least two virtual network functions process, in parallel, the copy of at least the portion of the plurality of data packets associated with the service function chain;

receiving, from the at least two virtual network functions, processed packets comprising the copy of at least the portion of the plurality of data packets associated with the service function chain, each after having been processed, in parallel, by the at least two virtual network functions; and combining, by a merge function, the processed packets and at least the portion of the plurality of data packets.

16. The computer-readable storage medium of claim 15, wherein the operations further comprise receiving, by a configuration function, a service function chain layout from the controller, wherein the service function chain layout identifies the at least two virtual network functions in the service function chain.

17. The computer-readable storage medium of claim 16, wherein the operations further comprise determining, by the configuration function, how to mirror at least the portion of the plurality of data packets to the at least two virtual network functions.

18. The computer-readable storage medium of claim 17, wherein the operations further comprise receiving, by the configuration function, information about the at least two virtual network functions to be utilized by the merge function.

19. The computer-readable storage medium of claim 18, wherein the mirror function and the merge function utilize a traffic steering table and a packet state table; wherein the traffic steering table comprises a flow ID, a service chain ID, and a description of the plurality of virtual network functions; and wherein the packet state table comprises a per-packet unique ID for each data packet in the plurality of data packets, a packet reference, an intermediate packet buffer, a virtual network function counter array, and a timeout.

20. The computer-readable storage medium of claim 19, wherein the per-packet unique ID comprises a key for each item listed in the packet state table and for mapping the plurality of data packets in the merge function; wherein the packet reference comprises a pointer for each data packet in the plurality of data packets to a memory address in which a corresponding original data packet is stored for use by the merge function; wherein the virtual network function counter array records a number of virtual network functions in each parallel component of the service function chain; and wherein combining, by the merge function, the processed packets comprises in response to a virtual network function counter in the virtual network function counter array reaching zero, combining, by the merge function, the processed packets.

* * * * *